(12) United States Patent
Egedal et al.

(10) Patent No.: US 9,509,141 B2
(45) Date of Patent: Nov. 29, 2016

(54) BLACK START OF WIND TURBINE DEVICES

(75) Inventors: Per Egedal, Herning (DK); Sathees Kumar, Herning (DK); Kaj Skov Nielsen, Issaquah, WA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 291 days.

(21) Appl. No.: 13/087,505

(22) Filed: Apr. 15, 2011

(65) Prior Publication Data

US 2012/0261917 A1    Oct. 18, 2012

(51) Int. Cl.
| | |
|---|---|
| *F03D 9/00* | (2016.01) |
| *H02P 9/04* | (2006.01) |
| *H02J 3/38* | (2006.01) |
| *F03D 7/02* | (2006.01) |

(52) U.S. Cl.
CPC .............. *H02J 3/38* (2013.01); *F03D 7/026* (2013.01); *F03D 9/005* (2013.01); *F05B 2260/85* (2013.01); *Y02E 10/723* (2013.01); *Y02E 10/725* (2013.01); *Y02E 10/763* (2013.01)

(58) Field of Classification Search
CPC ........ H02K 7/18; H02K 7/183; F03D 7/026; F03D 9/005; H02J 3/38; H02J 3/40; H02J 3/386

USPC ................................................... 290/44, 55
See application file for complete search history.

(56) References Cited

U.S. PATENT DOCUMENTS

| | | |
|---|---|---|
| 2008/0001408 A1 | 1/2008 | Liu et al. |
| 2008/0284172 A1 | 11/2008 | Nielsen |
| 2009/0278354 A1* | 11/2009 | Ichinose et al. ............... 290/44 |

FOREIGN PATENT DOCUMENTS

| | | |
|---|---|---|
| EP | 1909371 A2 | 4/2008 |
| EP | 1993184 A1 | 11/2008 |

OTHER PUBLICATIONS

International Search Report, Mar. 23, 2012, pp. 1-9.

* cited by examiner

*Primary Examiner* — Tulsidas C Patel
*Assistant Examiner* — Thomas Quigley

(57) ABSTRACT

A wind turbine device having in one embodiment a diesel generator to initialize a black start in case of a blackout of an electricity network is disclosed. For performing the black start, the diesel generator provides a predetermined voltage to a power output of the wind turbine device in order to imitate the electricity network in its running state. A wind park is also disclosed, the wind park having in one embodiment at least two wind turbine devices. In one embodiment a wind park controller provides the same reference value for the phase angle φ for the at least two turbines.

10 Claims, 7 Drawing Sheets

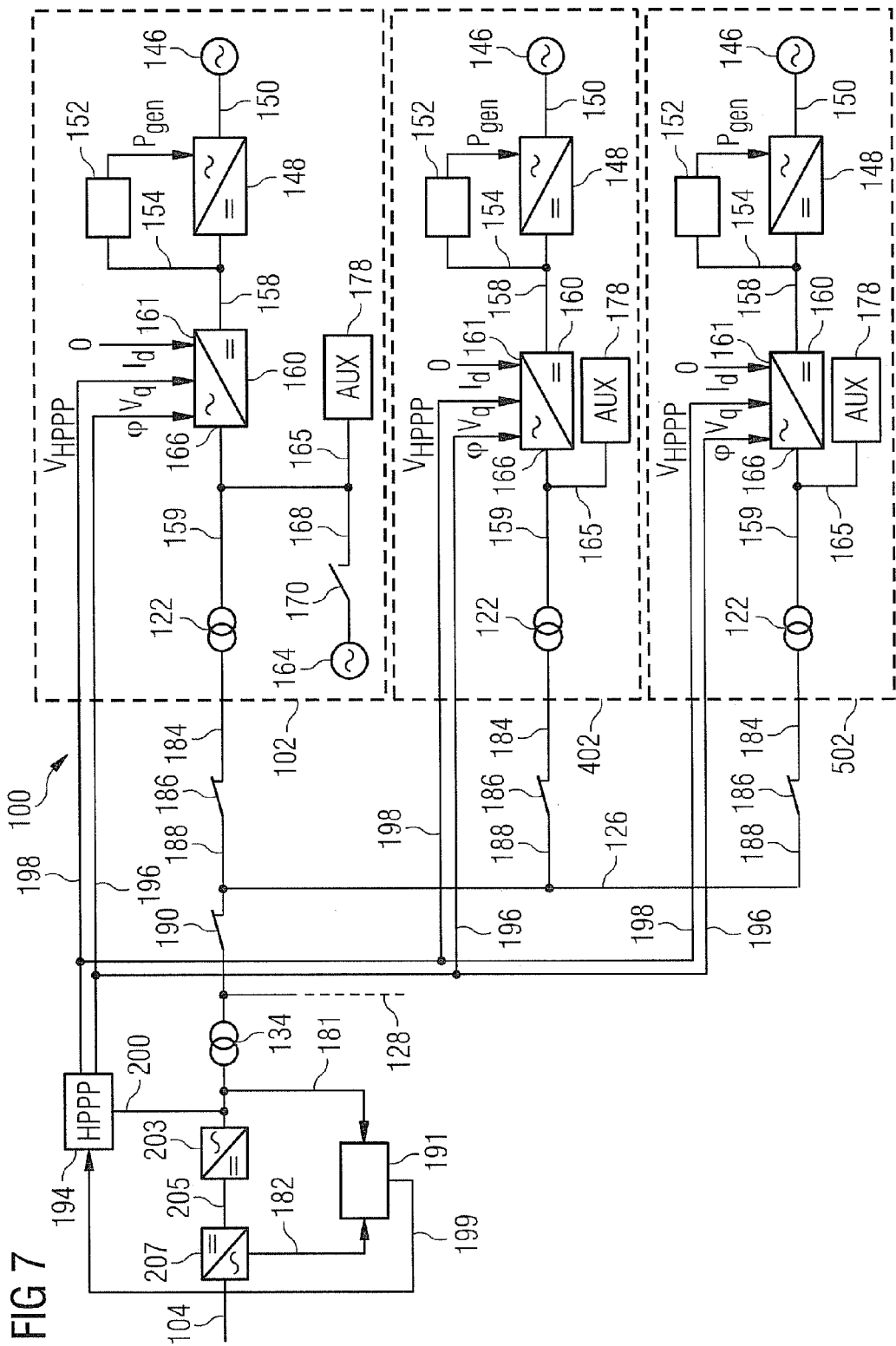

BLACK START OF WIND TURBINE DEVICES

FIELD OF INVENTION

The present invention relates to the field of wind parks and wind turbine devices.

ART BACKGROUND

US 2008/0284172 A1 relates to a wind power plant and a method of start up at least a part of a wind power plant connected to an external grid substantially without any energy delivered from the external grid for the start up is provided. The wind power plant having a plurality of wind turbines and at least one power source connected to at least one of the wind turbines in order to start the wind turbine while isolated from the remaining wind turbines. The started wind turbine may then supply power in order to start further wind turbines. Power may be delivered to the grid from the started wind turbines.

In view of the above-described situation, there exists a need for an improved technique that enables to provide good black start characteristics of a wind turbine device or of a wind park while substantially avoiding or at least reducing one or more of the above-identified problems.

SUMMARY OF THE INVENTION

This need may be met by the subject matter according to the independent claims. Advantageous embodiments of the herein disclosed subject matter are described by the dependent claims.

According to a first aspect of the invention there is provided a wind turbine device comprising a power output coupleable to an electricity network; a coupler; and a power unit for providing a predetermined voltage to the power output via the coupler in case of a black-out of the electricity network, the predetermined voltage imitating the electricity network in its running state.

This aspect is based on the idea that a good controlability of the wind turbine device is provided if the wind turbine device is run with a simulated electricity network. According to embodiments of the herein disclosed subject matter the black start characteristics of the wind turbine device and, in other embodiments, the black start characteristics of the wind park comprising the wind turbine device is improved.

In an embodiment, the coupler has a decoupling state in which the power unit is disconnected or, in another embodiment, decoupled from the power unit.

According to an embodiment, the electricity network is an external grid. According to a further embodiment, the wind turbine device is a member of a wind park having a plurality of wind turbine devices, the wind park having a wind park output coupleable to the electricity network. In such an embodiment, the electricity network is external to the wind park and is also in this case referred to as external grid.

According to an embodiment, imitating the electricity network allows to operate and control the wind turbine device until the electricity network is again in its running state. Hence in such an embodiment allows to control the wind turbine device and supply electrical power generated from wind power to auxiliary devices of the wind turbine device.

According to an embodiment, a control unit of the wind turbine device (e.g. a wind park controller) is configured for shutting down the wind turbine device and performing a normal start-up of the wind turbine device if the electricity network is again in its running state. According to a further embodiment, the control unit of the wind turbine device is configured for synchronizing the already running (black-started) wind turbine device with the electricity network and thereafter connecting the wind turbine device to the electricity network if the electricity network is again in its running state.

According to a further embodiment, the power unit includes a diesel generator. A diesel generator is well suited for integration into a wind turbine device which is in accordance with embodiments of the herein disclosed subject matter. In particular, the diesel generator is well suited for simulating the electricity network in its running state. According to an embodiment, a diesel generator is any device comprising a diesel driven machine (e.g. a diesel motor) and an electrical machine which is driven by the diesel driven machine and generates, in response hereto, electrical power. For example, in an embodiment, the Diesel generator is embodied by a diesel driven machine which drives an alternator (synchronous machine). In another embodiment, the Diesel generator is embodied by a diesel driven machine which drives an asynchronous machine.

According to an embodiment, the power output is an AC power output and the power unit is configured for providing an AC power to the power output.

According to a still further embodiment, the wind turbine device further comprises a turbine transformer. In a further embodiment, the coupler is configured for electrically coupling the power unit to the wind turbine side of the turbine transformer, i.e. the side of the turbine transformer which is coupled or coupleable to the wind turbine generator.

In the above mentioned embodiments and generally herein, "electrically coupled" does not necessarily imply an direct connection of the coupled entities, nor does it necessarily imply an electrical (galvanical) connection. Rather, the electrically coupled entities may be galvanically separated in one embodiment. In such an embodiment the electrical coupling nonetheless provides for transfer of electrical energy between the electrically coupled entities. Furthermore, in other embodiments, the electrically coupled entities are electrically connected or, in still further embodiments, galvanically connected. According to a further embodiment, electrical decoupling prohibits the transfer of electrical energy between the electrically decoupled entities. Further, any intermediate element may be located between the electrically coupled entities.

According to a further embodiment, the wind turbine device further comprises an DC/AC converter device for receiving electrical power generated by the wind turbine generator and providing, in response hereto, a converted AC power at a converter output; and a phase controller (e.g. a phase-locked loop) for synchronizing the phase angle of the converted AC power with the phase angle of the predetermined voltage provided by the power unit. In one embodiment, the converter output is the power output. In a further embodiment, the wind turbine side of the turbine transformer is electrically coupled or coupleable to the converter output of the DC/AC converter.

According to an embodiment, the converter device has a control input for receiving from a wind park controller at least one set point for the converter device.

According to a second aspect of the herein disclosed subject matter, a wind park is provided, the wind park comprising: a wind turbine device according to the first aspect or an embodiment thereof.

According to an embodiment of the second aspect, the wind park comprises a further wind turbine device having a power output coupleable to the electricity network; and a further coupler for coupling the power output of the wind turbine device to the power output of the further wind turbine device to start the further wind turbine device in case of a black-out of the electricity network.

Hereinafter the wind turbine device according to the first aspect or an embodiment thereof is also referred to as first wind turbine device and the further wind turbine device is referred to as second wind turbine device.

Hence the second wind turbine device may be started with the power provided with the previously started and already running first wind turbine device. In an embodiment, the first wind turbine device provides a predetermined voltage to the power output of the second wind turbine device wherein the predetermined voltage imitates the electricity network in its running state.

According to a further embodiment, the wind park further comprises a wind park control arrangement configured for providing identical set points of at least one output power related variable to both the wind turbine device and the further wind turbine device. According to an embodiment, the further wind turbine device comprises a control input for receiving from a wind park controller at least one a set point for the converter device of the further wind turbine device. An output power related variable is e.g. a phase angle, a voltage, a power, etc.

The control arrangement includes in an embodiment a wind park controller and at least one coupler for coupling the wind park controller to each of wind turbine device and the further wind turbine device. Each coupler may provide a dedicated connection between the wind park controller and one of the wind turbine device and the further wind turbine device. According to other embodiments, coupler may provide a connection between a one output of the wind park controller and both the wind turbine device and the further wind turbine device. For example, in an embodiment the coupler includes a branched coupling structure electrically connecting the one output of the windpark controller to at least two wind turbine devices.

According to a further embodiment, the wind park further comprises a point of common coupling, to which the wind turbine device and the further wind turbine device are coupleable; a coupler, the coupler having a first state in which the point of common coupling is connect to the electricity network, the coupler having a second state, in which the point of common coupling is disconnected from the electricity network; and a synchronization unit connectable to the point of common coupling and to the electricity network to determine the frequency of the power provided by the wind turbine device and the frequency of the electricity network and to provide, in response hereto, a synchronization signal to the wind park controller in order to synchronize the frequency of the power provided by the wind turbine device to the frequency of the electricity network. According to a further embodiment, the wind park controller is configured for allowing the coupler to be set in the first state if the frequency of the power provided by the wind turbine is synchronized to the frequency of the electricity network.

It is noted that according to an embodiment of the herein disclosed subject matter, the further wind turbine device is only one of a plurality of further wind turbine devices. That is, in one embodiment, each of the plurality of further wind turbine devices is configured according to one or more embodiments described with regard to "the" further wind turbine device described above.

According to a third aspect of the herein disclosed subject matter there is provided a method of blackstarting a wind turbine device after a blackout of an electricity network to which the wind turbine device is coupleable, the method comprising providing a predetermined voltage to the wind turbine device, the predetermined voltage imitating the electricity network in its running state.

As used herein and as is common to a skilled person, a black-start is a start after a blackout of the electricity network.

According to an embodiment, the method comprises providing the predetermined voltage with a diesel generator.

According to a further embodiment, the method further comprises setting both, the active power and the reactive power to be generated by the wind turbine device to zero when starting to provide the predetermined voltage to the wind turbine device.

According to a fourth aspect of the herein disclosed subject matter, there is provided a method of blackstarting a wind park after a blackout of an electricity network to which the wind park is coupleable, wherein the wind park has at least two wind turbine devices, the method comprising providing an identical set point of an output power related variable (e.g. phase angle) to each of the at least two wind turbine devices before connecting the respective wind turbine device to the electricity network.

In an embodiment of the first aspect, the wind turbine devices are configured in accordance with the first aspect or an embodiment thereof.

According to a further embodiment, the method further comprises: subsequently blackstarting the at least two wind turbine devices; and connecting the at least two wind turbine devices to the electricity network after all of the at least two wind turbine devices have been blackstarted.

According to a fifth aspect of the herein disclosed subject matter a computer program for controlling a physical object, namely a wind turbine device, is provided, the computer program, when being executed by a data processor, being adapted for controlling the method as set forth in the third aspect or an embodiment thereof.

According to a sixth aspect of the herein disclosed subject matter a computer program for controlling a physical object, namely a wind park, is provided, the computer program, when being executed by a data processor, being adapted for controlling the method as set forth in the fourth aspect or an embodiment thereof.

In an embodiment, the data processor is included in a device controller of a wind turbine device. In another embodiment, the data processor is included in a wind park controller which is configured for controlling a wind park and in particular a plurality of wind turbine device included in the wind park.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

In the above there have been described and in the following there will be described exemplary embodiments of the subject matter disclosed herein with reference to a wind turbine de vice, a wind park, a method of blackstarting a wind turbine device, a method of blackstarting a wind park and corresponding computer programs. It has to be pointed out that of course any combination of features relating to different aspects of the herein disclosed subject matter is also possible. In particular, some embodiments have been described with reference to apparatus type claims whereas other embodiments have been described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims is considered to be disclosed with this application.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWINGS

FIG. 7 shows the wind park of FIG. 1 in an alternative fifth step of a blackstart procedure according to the herein disclosed subject matter.

DETAILED DESCRIPTION

Figure 1:
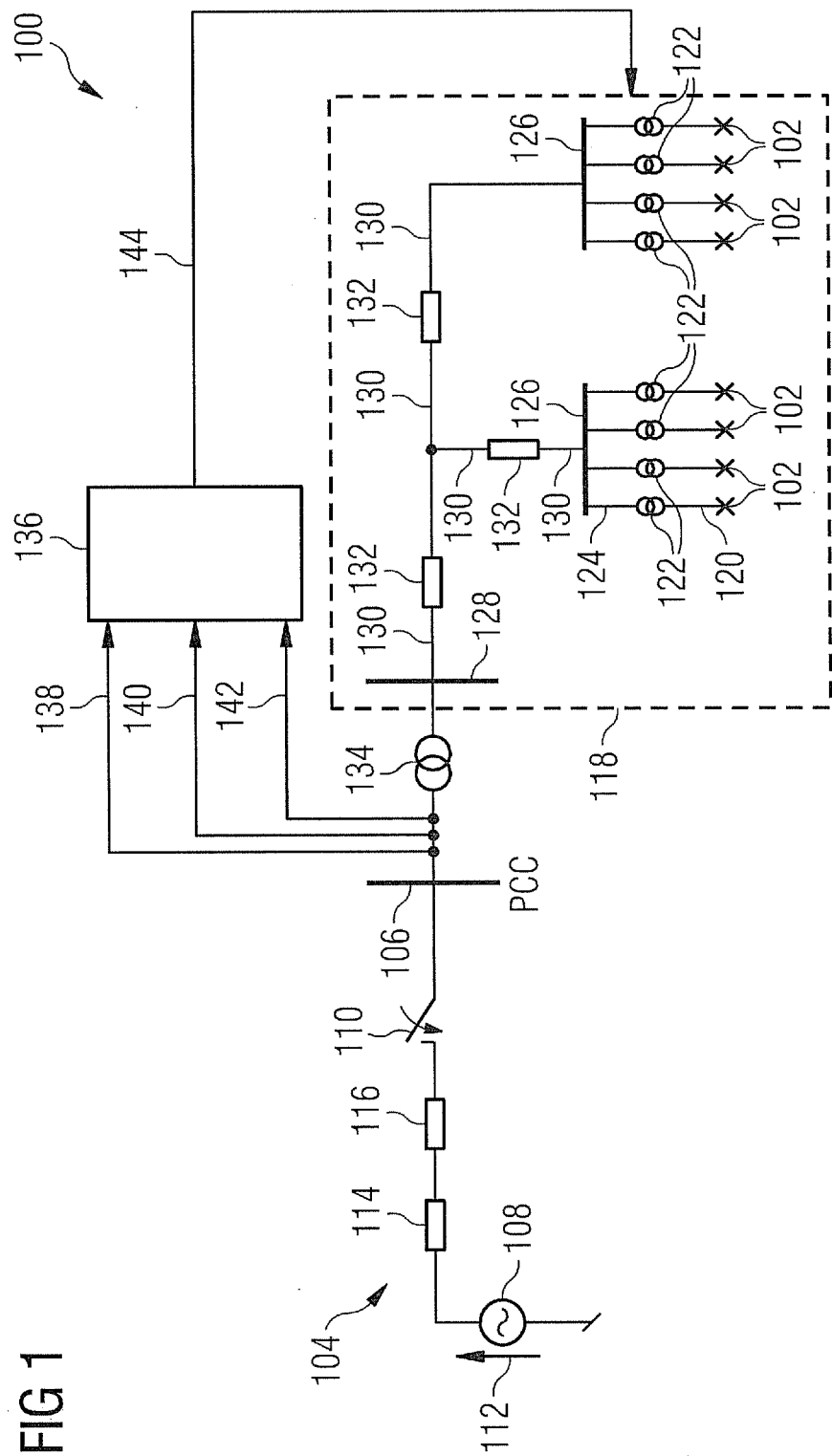
FIG. 1 shows a wind park in accordance with embodiments of the herein disclosed subject-matter.

The illustration in the drawings is schematic. It is noted that in different figures, similar or identical elements are provided with the same reference signs or with reference signs, which are different from the corresponding reference signs only within the first digit. A repeated description of such features for each individual figure is omitted. Rather, the description of a feature given in regard to a particular figure is valid for all other figures unless noted otherwise. Furthermore, not all elements of the described wind park are shown in each figure. However, absence of an element in a figure relating to a further step the described methods does not necessarily imply absence of this element. Rather, in some drawings some elements have been omitted in order to not obscure the described features.

All large power plants and large scale wind parks require some contingency arrangements to restart in the unlike event that all or parts of the power producing units shuts down. The process of restoring the power system to deliver power again is referred to as Black start. Aspects and embodiments of the herein disclosed subject matter propose a method of starting a wind park which has lost grid e.g. due to transmission line loss, fault or any other conditions which makes the wind park non-eligible to be grid connected. Embodiments of the herein disclosed subject matter propose a way to start the turbines in island mode (not connected to the external grid) with the help of a diesel generator providing the necessary power to the auxiliary unit for the turbines.

FIG. 1 shows a wind park 100 in accordance with embodiments of the herein disclosed subject-matter. In particular, FIG. 1 generally shows an islanded wind park.

Without having aspects and embodiments of the herein disclosed subject matter realized in a wind park or in a wind turbine device, during disconnection from external grid the wind park won't be able to operate as the produced power cannot be shipped to the external network and the supply voltage of the external grid would be zero volts (0 V). This configuration is improved according to the herein disclosed subject matter in such way that the turbines on the radial are prepared to start up from total disconnection (black start).

The wind park 100 shown in FIG. 1 comprises a plurality of wind turbine devices 102 which are coupleable with an electricity network 104. The wind park 100 comprises a point of common coupling (PCC) 106 to which the wind turbine devices are coupleable. The electricity network may be regarded as a power source 108, which is coupleable to the point of common coupling 106 via electrical lines and a circuit breaker 110.

According to an embodiment, the power source 108 is an AC power source. According to a further embodiment, the electricity network is a grid. For example, the power source 108 represents a source for the grid voltage indicated at 112 in FIG. 1. The impedance of the electrical lines connecting the grid to the point of common coupling 106 may comprise several components, such as for example a grid impedance 114 and an impedance of a transmission line 116.

According to an embodiment, the wind turbine devices 102 form a local electricity network, such as an islanded wind park grid 118. The local electricity network 118 comprises electrical lines 120 by which the wind turbine devices 102 are coupled to a low voltage side of a transformer 122. According to an embodiment, for each wind turbine device 102 a separate transformer 122 is provided. A high voltage side of the transformer 122 is connected via electrical lines 124 to a busbar 126. According to an embodiment, a group of wind turbine devices 102, for example four wind turbine devices 102 as shown in FIG. 1, is connected to the busbar 126 in parallel. The groups of wind turbine devices are coupled to a common busbar 128 via electrical lines 130. The impedances of the electrical lines 130 are indicated at 132 in FIG. 1.

According to an illustrative embodiment, the wind turbine devices 102 provide a voltage of 690 Volts (V), whereas the high voltage side of the transformers 122 operates at 35 kilovolts (kV). The common busbar 128 is coupled to the point of common coupling 106 via a transformer 134 which transforms the high voltage provided by the individual transformers 122 to the voltage level of the electricity network 104, e.g. to the voltage level of the external grid in one embodiment. According to an embodiment, the voltage of the external grid is 275 kilovolt (kV). In other embodiments, the voltage of the external grid is 400 kV, just to give another example.

According to a further embodiment, the wind park 100 comprises a wind park control arrangement comprising a wind park controller 136 which has at least one input for receiving an operating parameter of the electricity network 104, such as a power signal 138, indicative of the power provided to the point of common coupling 106 by the local electricity network 118, a frequency signal 140 indicating the frequency thereof, and a voltage signal 142 indicating a voltage thereof. In response to the input parameters 138, 140 and 142, the wind park controller provides at least one reference value 144 for the local electricity network 118. A reference value 144 may be, according to an embodiment, a reference power of each wind turbine of the local electricity network 118 and/or a reference voltage of each wind turbine of the local electricity network 118.

Figure 2:
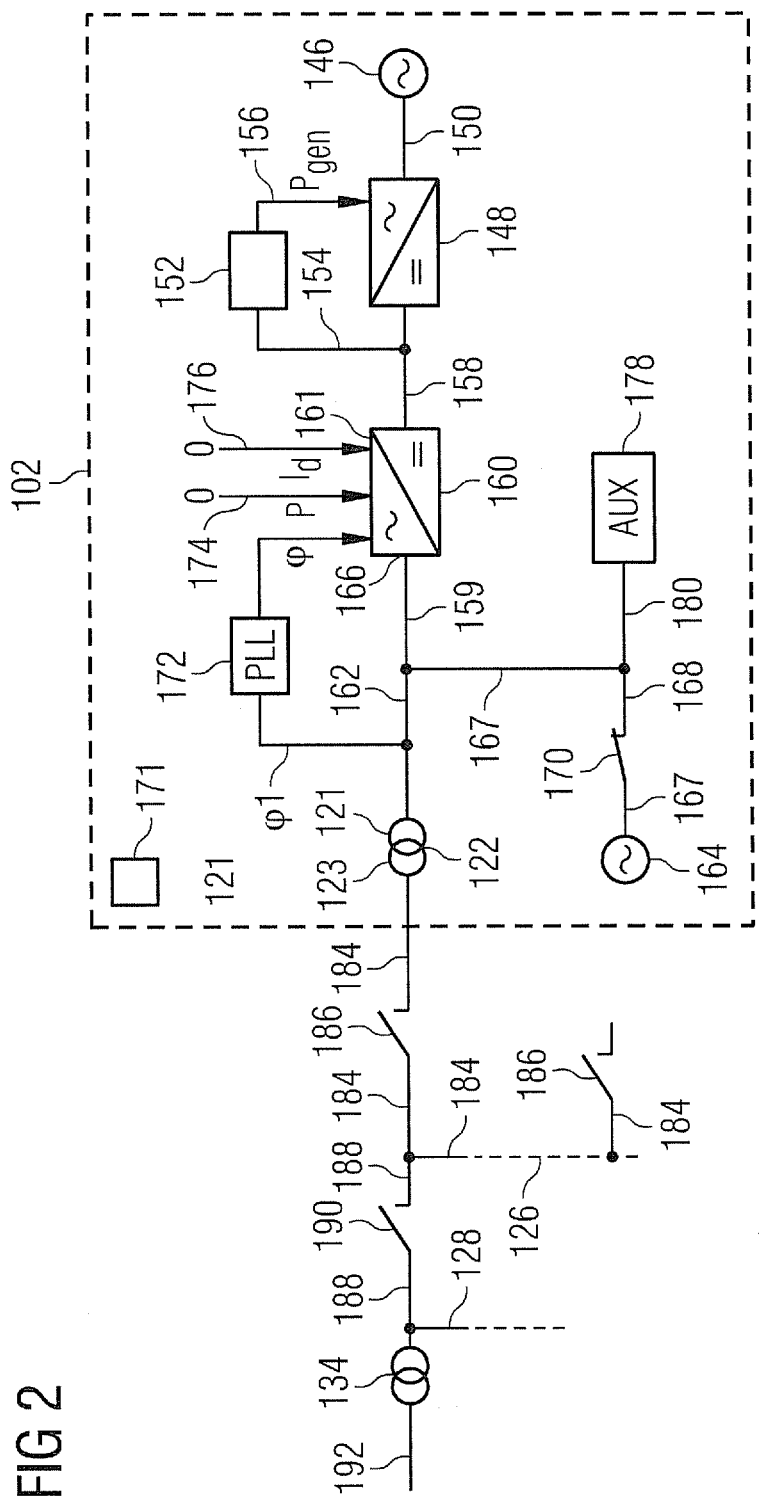
FIG. 2 shows the wind park of FIG. 1 in a first step of a blackstart procedure according to the herein disclosed subject matter.

FIG. 2 shows a wind turbine device 102 in accordance with embodiments of the herein disclosed subject-matter. In an embodiment in accordance with FIG. 2, and in contrast to FIG. 1, the transformer 122 is included in the wind turbine device 102.

The wind turbine device 102 comprises a turbine generator 146 which is coupled to the rotor of the wind turbine and provides electrical power in response to the driving by the wind turbine. The electrical power generated by the turbine generator 146 is fed to an AC/DC converter 148 via electrical lines 150. A DC controller 152 measures the DC voltage at the output of the AC/DC controller 148, indicated at 154, and generates in response hereto a set value 156 for the power to be generated by the turbine generator 146. The DC output power 158 of the AC/DC converter 148 is fed to a DC/AC converter 160 which provides an AC output power 162 to a turbine side 121 of the transformer 122 that is associated with the wind turbine device 102. The converter 160 has an input 161 for receiving set point values for operating parameters of the converter 160 such as phase angle, power to be drawn from the turbine generator 146, output voltage, etc.

So far, the normal operation of the wind turbine device 102 has been described.

Further shown in FIG. 2 is a power unit 164 which is configured and arranged for providing a predetermined voltage to a power output 166 of the wind turbine device via a coupler which is indicated at 168 in FIG. 2. According to an embodiment, the coupler 168 includes a switch 170 and electrical lines 167 to thereby provide the predetermined voltage to the power output 166 if the switch, indicated at 170 in FIG. 2, is closed. According to other embodiments, other types of couplers are provided.

According to an embodiment, the power output 166 is the AC output of the DC/AC converter 160. However, it should be understood that this is merely exemplary and according to other embodiments, the power output may be provided at any other point of the power path in the wind turbine device 102. However, it should be understood that the level of the predetermined voltage is adapted to the selected power output, such that the predetermined voltage imitates the electric network in its running state. According to an embodiment, the power output 166 of the wind turbine device is electrically coupled to the turbine side 121 of the device transformer 122, e.g. by an electrical line 159.

According to an embodiment, a phase controller 172 is provided, wherein the phase controller is configured for synchronizing the phase angle φ of the converted power that is output by the DC/AC converter 160 with the phase angle φ1 of the predetermined voltage provided by the power unit 164. Further according to an embodiment, the power, i.e. the active power as well as the reactive power are set to zero during the black start of the wind turbine device 102. Since the converter 160 provides a certain voltage which is, in one embodiment, equal to the predetermined voltage, a power of zero means that the current, i.e. active current and reactive current, is set to zero. The setting of the power P to zero is indicated at 174 in FIG. 2 and setting the current to zero is indicated at 176 in FIG. 2. According to an embodiment, a device controller 171 is provided for setting the active current and the reactive current to zero by providing respective control signals 174 and 176. According to an embodiment, the device controller 171 is a local controller which is configured for controlling a single wind turbine device 102. According to other embodiments, the device controller 171 is configured for controlling two or more wind turbine devices. According to still other embodiments, the power and the current are controlled by a wind park controller (not shown in FIG. 2). In an embodiment, the device controller 171 comprises a data processor for carrying out a computer program, which provides the intended function of the device controller as disclosed herein.

According to an embodiment, the electrical power provided by the power unit 164 is used at least partially to charge an internal power supply of an auxiliary system 178. To this end, the power unit 164 is connected to the auxiliary system 178 via suitable couplers, such as electrical lines 180. The auxiliary system 178 contains e.g. pumps, motors and the internal power supply (not shown in FIG. 2). In other embodiments, the auxiliary system 178 contains other elements or additional elements.

According to an embodiment, the wind park comprises a pad coupler for coupling an output of the wind turbine device 102, for example the high voltage side 123 of the transformer 122 to another wind turbine device. Such a pad coupler may include electrical lines, indicated at 184 in FIG. 2, as well as one or more switches for respectively coupling or decoupling two or more wind turbine devices 102, these switches being indicated at 186 in FIG. 2.

Further, the wind park may include a coupler for selectively coupling an output of the wind turbine device 102, for example the high voltage side 123 of the transformer 122 to a substation park transformer 134. Such a coupler may include electrical lines, indicated at 188 in FIG. 2, and one or more switches, indicated at 190 in FIG. 2.

According to an embodiment, the pad coupler 184, 186 includes the busbar 126. According to a further embodiment, the coupler 188, 190 for selectively coupling an output of the wind turbine device 102 to the substation park transformer 134 includes the common busbar 128 (see also FIG. 1).

According to an embodiment, the output of the substation park transformer 134 is coupled or coupleable to the point of common coupling, e.g. as indicated at 106 in FIG. 1 via an electrical line 192.

According to exemplary embodiments of the herein disclosed subject matter, the idea of the first blackstart step shown in FIG. 2 is to have a local diesel generator connected on the low voltage side of the turbine transformer. The purpose of the diesel generator is to provide the necessary power the controls and auxiliary which contains the pumps, motors and internal power supply. Furthermore the diesel generator imitates the external grid by setting up a voltage (690V) on the low voltage side. The generated amount of the active power is set to zero (0 megawatt (MW)) and the reactive power (d-axis current Id) is likewise set to zero (0 megavoltamperes (MVA)). Vector oriented control is applied according to embodiments. The phase locked loop in the converter calculates the angle φ from voltage angle and makes sure that the angle is synchronized with the phase angle of the diesel generator.

Figure 3:
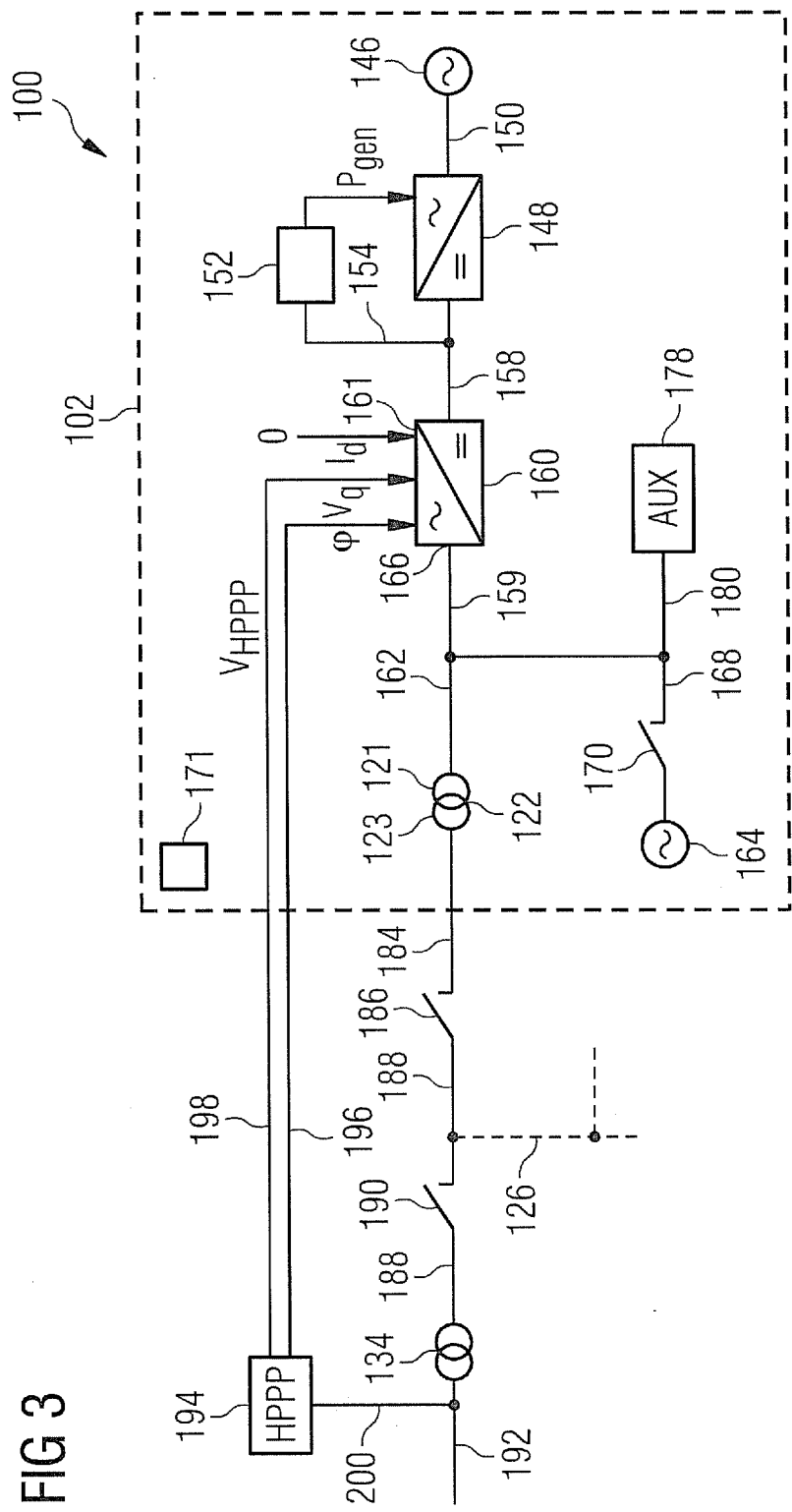
FIG. 3 shows the wind park of FIG. 1 in a second step of a blackstart procedure according to the herein disclosed subject matter.

FIG. 3 relates to a subsequent step of the black start procedure according to embodiments of the herein disclosed subject-matter. The respective elements, which have been already described with regard to FIG. 2 are provided with the same reference signs and the description thereof is not repeated here. Further, elements which are depicted in FIG. 2 and which are no more shown in FIG. 3 are not necessarily absent, but are not necessary for the explanation of the further step shown in FIG. 3, of the black start procedure.

In the further step shown in FIG. 3, the coupler 168, 170 is in a second state, in which the power unit 164 is decoupled from the power output 166. In this stage, the power output 166 is neither coupled to another wind turbine device, nor to the electricity network, as indicated by the open switches 186 and 190. According to an embodiment, power for internal power consumption, for example for the device controller of the wind turbine device 102, is provided by the auxiliary system 178. In an embodiment shown in FIG. 3, the auxiliary system 178 is electrically coupled to the power output 166 by electrical lines 165 in order to use the converter output voltage to feed the auxiliary system 178 as the diesel generator is disconnected. Further, since the power output 166 of the wind turbine device 102 is decoupled from the power unit 164, the phase φ1 of the power unit 164 is no longer used for providing a set point of the phase angle to the converter 160. Rather, according to an embodiment of the herein disclosed subject-matter, the set point for the phase angle φ is set by a wind park control arrangement which according to an embodiment includes a wind park controller 194 and at least one electrical line 196. In an embodiment, the wind park controller 194 comprises a data processor for carrying out a computer program, which provides the intended function of the wind park controller 194 as disclosed herein. In an embodiment, the functions of the wind park controller 136 as described with regard to FIG. 1, i.e. for controlling the normal operation of the wind park and the function of the wind park controller 194 as described with regard to FIG. 3, i.e. for controlling the black start, are provided by a single entity. In other embodiments the wind park controllers 136, 194 are individual entities, which are, in an embodiment, coupled for synchronization of the operation of both controllers.

According to a further embodiment, the converter has a further input for receiving a voltage set point for setting a voltage to be generated at the converter output 166 by the DC/AC converter 160. The input for receiving the set point Vq of the output voltage of the converter 160 is coupled with the wind park controller 194 via at least one electrical line 198 in one embodiment. In accordance with a further embodiment, the current set point Id is still received from the device controller 171.

According to an embodiment, the wind park controller 194 has an input for receiving electrical parameters of the electricity network 104, e.g. of electrical parameters at the point of common coupling 106. In order to receive respective actual parameter values from the electrical network 104, a respective coupler 200 is provided for electrically coupling the wind park controller 194 to the electricity network 104.

According to exemplary embodiments of the herein disclosed subject matter, in the step shown in FIG. 3 the converter reference φ1 for the phase angle is replaced with a reference φ from the wind park controller 194 (High Performance Park Pilot, HPPP). This reference shall be initialized based on the reference from the first turbine to ensure a bump less transmission. The reference for the initialization can either be measured or collected via the network from the first turbine. The grid side converter is now controlled as a voltage source, with the reference given from the HPPP. In the exemplary embodiment the voltage output is 690V (VN). The Diesel generator is disconnected right after the voltage setpoint VHPPP from the wind park controller 194 has been received at the converter. The HPPP specifies the voltage setpoint (or references) sent to the converter 160, i.e. a value between 0-100% where 100% is nominal voltage. The wind park controller 194 is supplied from a local battery or some other UPS unit in an embodiment.

Figure 4:
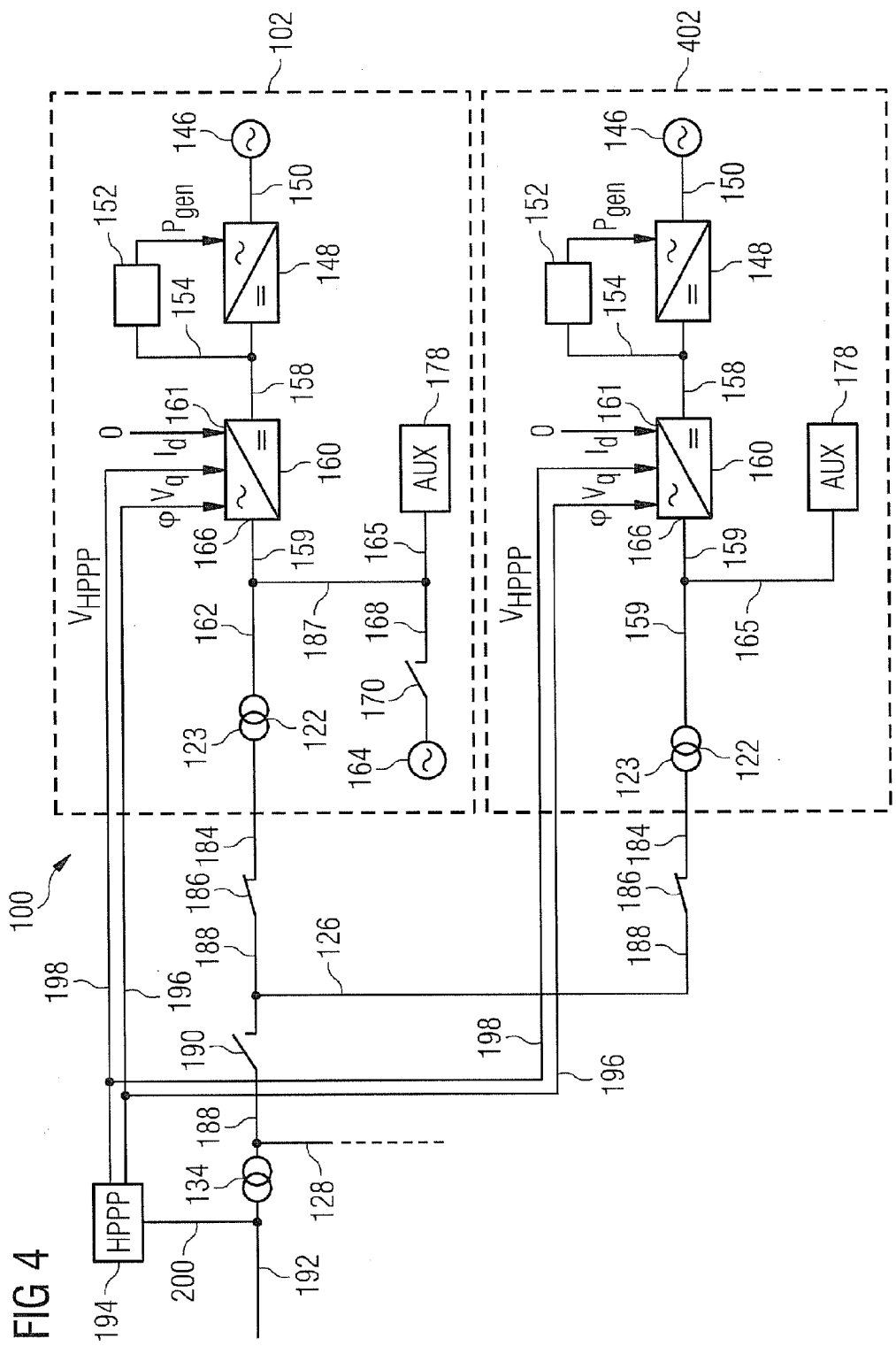
FIG. 4 shows the wind park of FIG. 1 in a third step of a blackstart procedure according to the herein disclosed subject matter.

FIG. 4 shows another subsequent step of a black start procedure according to embodiments of the herein disclosed subject-matter.

As shown in FIG. 4, the wind park 100 comprises two or more wind turbine devices, two of which 102, 402 are shown in FIG. 4.

In the step shown in FIG. 4, the wind park control arrangement 194, 196, 198 is configured for providing identical sets of an output power related variable, for example the phase angle φ or the voltage set point Vq to both wind turbine devices 102. According to an embodiment shown in FIG. 4, the wind park controller 194 has a single output for each output power related variable which is connected to each control input 161 of the wind turbine device, with the control input 161 being configured for receiving from the wind park controller 194 a set point of the respective output power related variable. The current set point Id is still received from the device controller (not shown in FIG. 4). In an embodiment, the control input 161 of the wind turbine device is the control input of the converter 160.

In the black start step shown in FIG. 4, a first turbine 102 is initialized and produces electrical power. Once the first wind turbine device 102 is initialized, additional wind turbine devices such as the wind turbine device 402 can be set up to run. To this end, the coupler 184, 186, 188 is set into its coupling stage, thereby coupling the high voltage sides 123 of the transformers 122 via the bus bar 126 electrically together. That means, that the electrical power generated by the first wind turbine device 102 is provided to a power output of the second wind turbine device 402, in order to imitate to the second wind turbine device 402 the electricity network 104 in its running state.

According to an embodiment, the coupler 184, 186, 188 is configured for coupling corresponding power outputs of the individual wind turbine devices 102, 402, e.g. the high voltage sides of the transformers 122, as specified above. Instead of using the internal reference for the phase angle φ via the phase-locked loop 172 as shown in FIG. 2, in the black start step shown in FIG. 4 all wind turbine devices will be using the same wind park control reference phase angle, ensuring a stable voltage. In other words, all wind turbine devices are operating synchronously and emulate a single voltage generator. The current load is determined by the consumption of the turbines being connected. As specified with regard to the first wind turbine device 102 and the second wind turbine device 402, the wind turbine devices of a wind park are connected one by one, in small groups or feeder by feeder (via switches 190), according to respective embodiments. At this stage of the black start procedure, the wind power device will be able to track the wind direction changes, operate the critical heaters, coolers and dehumidifiers. Further, the running wind turbine devices provide wind speed and jaw direction data to a central server. The already running wind turbine devices provide critical power and recharge station battery systems in the wind park, for example in an offshore transformer station. This state, where power is provided to critical units of the wind turbine device and the wind park (such as a control unit, etc.) and where the battery systems are recharged, may be the final state and, according to an embodiment, may be maintained until the electricity network is restored. This allows to protect the wind turbines and maintains some level of control over the wind park during an extended blackout of the electricity network.

From this state on, further options are available. According to an embodiment, the wind park and the wind turbine devices thereof are stopped when the grid is available and a normal power up is performed.

According to another embodiment, after successful black start of the wind park, the wind park can be synchronized with the electricity network.

By operating the turbines on a common park controller voltage reference until they are synchronized to the electricity network, there is no need for a frequency control function. The consumption of the individual turbine devices connecting to the system during the black start is pulled from the "stiff" voltage source so that the power regulation is under control. A stiff voltage source is source which is very strong in the sense that the voltage output from the stiff source is constant irrespective how much current, power and reactive power is pulled from it (within certain limits). I.e. in an embodiment the output voltage of the stiff voltage source is constant.

Hence according to exemplary embodiments of the herein disclosed subject matter, once the turbine 1 is initialized additional turbines can be setup to run. Instead of using the internal reference $\phi$ via the PLL all turbines will be using the park controller reference $\phi$, Vq ensuring a stable voltage. This means that all turbines are operating synchronously and emulate a single voltage generator. The current load is determined by the consumption of the turbines being connected. Turbines are connected one by one, in small groups or feeder by feeder. At this stage the wind power plant will be able to track the wind direction changes, operate the critical heaters, coolers and dehumidifiers, provide wind speed and yaw direction data to the central server, provide critical power and recharge station battery systems e.g. on an offshore transformer station. This state may be selected as the final state until the grid is restored in order to protect the wind turbines and maintain some level of control over the plant during an extended outage. Stopping the plant when the gird is available and performing a normal power up is an option. By operating the turbines on a common park controller voltage reference VHPPP until they are synchronized to the grid, there is no need for a frequency control function in an embodiment. The consumption of the individual turbines connecting to the system during the black start is pulled from the "stiff" voltage source so the power regulation is under control.

Figure 5:
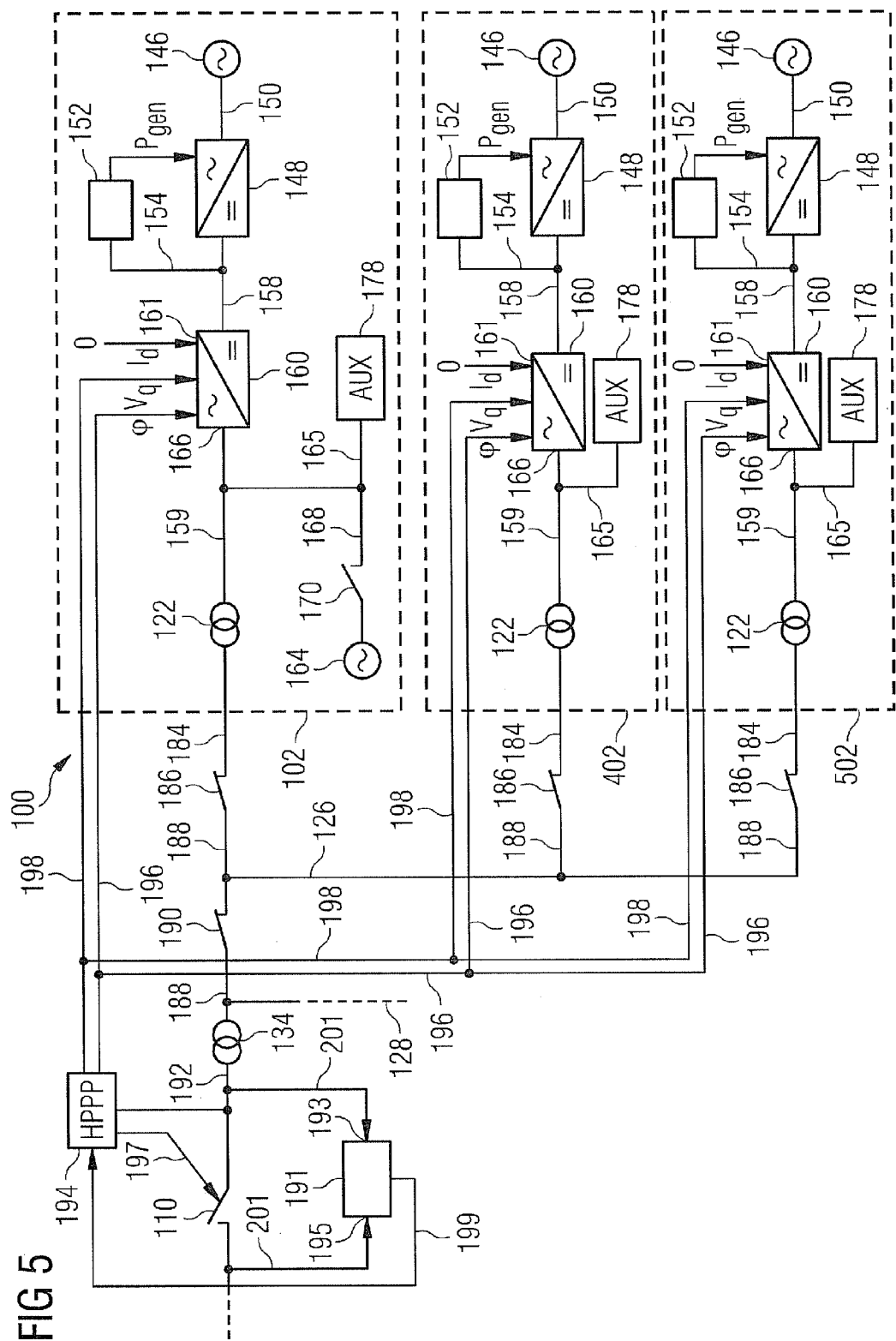
FIG. 5 shows the wind park of FIG. 1 in a fourth step of a blackstart procedure according to the herein disclosed subject matter.

FIG. 5 shows a further step after the wind park 100 has been black started. In order to synchronize the wind park with the electricity network, the wind park controller 194 is synchronized with the measured values in the electricity network at the point of common coupling 106 for both the phase $\phi$ and the voltage Vq. When the phases of the electricity network and of the wind park are synchronous and the voltages of the electricity network and the wind park are identical, then the substation breaker 110 can be closed in order to connect the wind park to the electricity network. This would be a very stiff voltage generator connected to the electricity network and can result in very large currents if the wind turbine devices are not switched to current control immediately. Therefore, according to an embodiment, after electrically connecting the wind park to the electricity network, a device controller (not shown in FIG. 5) which controls the operation of the wind turbine device 102 is set to a current control mode in order to control the current provided by the wind turbine device.

Shown in FIG. 5 is the wind park 100 in accordance with embodiments of the herein disclosed subject-matter. In FIG. 5, three wind turbine devices 102, 402 and 502 are shown. Thereof, wind turbine devices 402 and 502 are configured identically, while the first wind turbine device 102 comprises the diesel generator as described with regard to FIGS. 2 and 3. According to an embodiment shown in FIG. 5, the wind park 100 comprises a synchronization unit 191 which is configured for receiving input values that are related to output power related variables such as the phase and the voltage. According to an embodiment, the synchronization unit comprises an input for receiving values for the output power related variables of the wind park and another input for receiving the corresponding values from the electricity network. In response to the input values, the synchronization unit 191 provides a synchronization signal to the wind park controller 194 which in response hereto provides respective set points for the output power released variables to the individual wind turbine devices 102, 402, 502. According to an embodiment, the respective inputs 193 and 195 of the synchronization unit 191 are electrically coupled to the respective sides of the breaker 110, e.g. by electrical lines 201. According to an embodiment, the breaker 110 is controlled by the wind park controller 194, as indicated at 197 in FIG. 5. The synchronization signal provided by the synchronization unit 191 is indicated at 199 in FIG. 5.

According to exemplary embodiments of the herein disclosed subject matter, the wind park controller reference shall now be synchronized with the measured value at the point of common coupling PCC. This shall be matched for both the phase $\phi$ and for the voltage. When the phases are synchronous and the voltages are identical then the substation breaker 110 can be closed and the wind power plant 100 connected to the grid. This would be a very stiff voltage generator connected to the grid, and can result in very large currents if the turbines are not switched to current control immediately, what is indeed done according to an embodiment.

Figure 6:
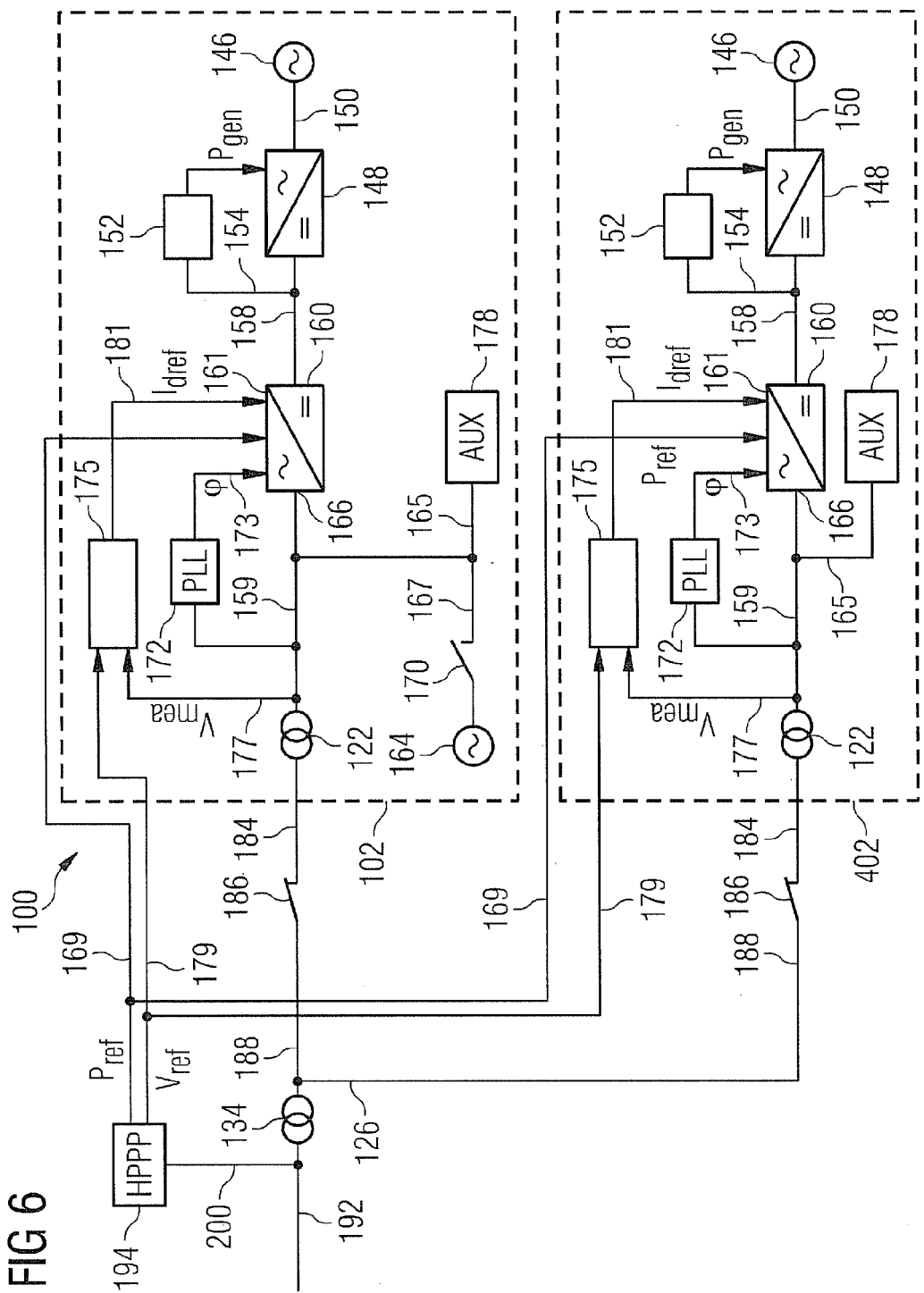
FIG. 6 shows the wind park of FIG. 1 in a fifth final step of a blackstart procedure according to the herein disclosed subject matter.

FIG. 6 shows the wind park 100 in a final stage, i.e. normal operation, after the black start. In this stage, the control of the phase angle $\phi$ is moved from the wind park controller to the local reference recorded by the phase-locked loop 172 which provides a control signal 173 for the phase angle $\phi$ to the DC/AC converter 160. The wind park controller 194 supplies reference values 179, 169 for voltage Vref and power Pref to the individual wind turbine devices 102 and 402.

In particular, according to an embodiment the reference value for the power 169 is provided to a control input 161 of the DC/AC converter 160 and the reference value for the voltage is provided to a control input of a voltage controller 175. The voltage controller 175 also receives a measured voltage at the output of the DC/AC converter 160, the measured voltage being indicated at 177 in FIG. 6. The voltage controller 175 receives the reference value for the voltage 179 and the measured voltage 177 and provides in response a current set point 181 to the DC/AC converter 160.

According to exemplary embodiments of the herein disclosed subject matter, a transition of the reference values for the phase angle φ from the Park Controller reference to the local reference recorded by the PLL is performed. Park Controller supplies voltage and power references as during normal operation.

Hence briefly summarizing, exemplary steps of a black-start procedure in accordance with embodiments of the herein disclosed subject matter include: (i) taking, by means of a phase-locked loop 172 a phase angle of the power unit 164 as a reference value for the phase angle of the DC/AC converter 160 for initiating a black start; (ii) supplying, by means of the wind park controller 194, a common reference for the phase angle to all wind turbine devices of the wind park; (iii) synchronizing the reference for the phase angle with the external electricity network if the external electricity network is again running; (iv) connecting the wind park to the electricity network; and (v) taking, by means of the phase locked loop 172, the reference value for the phase angle from the connected electricity network. It is noted that some embodiments of the herein disclosed subject matter include only some of the steps (i) to (v). For example, one embodiment includes only steps (i) and (ii).

FIG. 7 shows a further embodiment of how a wind park can be synchronized with an electricity network. According to an embodiment shown in FIG. 7, the wind park is coupled to the electricity network 104 with a high voltage DC network (HVDC network). A high voltage DC network may be employed if the wind park is located far from mainland or main distribution. In such a case it might be relevant to transmit the power through a DC link to reduce losses. Once the power reaches mainland it will be converted back to AC. The high voltage DC network comprises an AC/DC converter 203 which converts the AC output power of the wind park received from the high voltage side of the substation park transformer 134 into a high voltage DC power 205. The high voltage DC network further comprises a DC/AC converter 207 for converting the high voltage DC power 205 into an AC output power compatible with the voltage in the electricity network 104. In such an embodiment, the synchronization unit 191 is a high voltage DC controller which receives as a first input a signal 181 being indicative of the AC power provided by the wind park and as a second input a signal 182 being indicative of the DC high voltage in the electricity network, indicated at 104 in FIG. 7. According to an embodiment, the signal 182 indicative of the DC high voltage in the electricity network 104 is provided by an AC/DC converter 203 which converts the AC output of the wind park, i.e. the output of the substation park transformer 134 into a DC voltage. In response to the input signals 181 and 182, the synchronization unit 191 provides a synchronization signal 199 to the wind park controller 194. In response hereto, the wind park controller 194 provides respective set values for the phase angle φ and the voltage Vq to the individual wind turbine devices 102, 402 and 405, as already described with regard to FIG. 5.

Hence, according to exemplary embodiments of the herein disclosed subject matter, as an alternative to a wind park that is directly linked to the utility grid, the wind park can also be connected via a HVDC link. In this configuration the HVDC system will have to handle the final connection to the grid in a similar fashion to bridging two already operating grids where it is not possible to synchronize. However, the sync signal is still needed also in this case as it is necessary to make sure the external grid is ready before the wind farm can be connected.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

It is disclosed a wind turbine device having in one embodiment a diesel generator to initialize a black start in case of a blackout of an electricity network, to which the wind turbine device is coupleable. For performing the black start, the diesel generator provides a predetermined voltage to a power output of the wind turbine device in order to imitate the electricity network in its running state.

Further, a wind park is disclosed, the wind park having in one embodiment at least two wind turbine devices. In one embodiment a wind park controller provides the same reference value for the phase angle φ for the at least two turbines. According to a further embodiment, the wind park controller provides a voltage set point.

According to a further embodiment, a synchronization unit is provided which synchronizes the voltage magnitude and the phase of the wind park and the external grid before the wind park is connected to the external grid. Once this step is accomplished the turbines will be ready to supply power to the grid.

A black start, i.e. a start after a blackout of the electricity network, and in particular a black start of a wind park as described herein is much faster than a black start of an ordinary power plant and hence embodiments of the herein disclosed subject-matter will assist to set the grid in service much faster.

According to embodiments of the herein disclosed subject matter, any suitable component of the wind park, e.g. the wind park controller 194, the DC controller 152, device controller 171, may be provided in the form of a respective computer program product which enables a processor to provide the functionality of the respective component as disclosed herein. According to other embodiments, any such component of the wind park may be provided in hardware. According to other—mixed—embodiments, some components may be provided in software while other components are provided in hardware. Further, it should be noted that a separate component (e.g. module) may be provided for each of the functions disclosed herein. According to other embodiments, at least one component (e.g. a module) is configured for providing two or more functions as disclosed herein.

The invention claimed is:

1. A wind turbine device, comprising:
a power output of the wind turbine device coupleable to an electricity network;
an alternating current (AC) power unit;
a coupler connected between an output of the power unit and a line connected to carry power output of the wind turbine device, wherein the coupler is switchable to be in a connect state or a disconnect state,
wherein the power unit is arranged to generate an AC voltage that is coupled to the power output of the wind turbine device via the coupler in case of a black-out of the electricity network whereupon the coupler is switched to the connect state, the voltage generated by the power unit that is coupled to the power output of the wind turbine device being configured to imitate the electricity network in its running state;

a grid-side converter device for receiving power generated by a wind turbine generator of the wind turbine device and providing, in response hereto, a converted AC power at a grid-side converter output; and a phase controller for synchronizing the phase angle of the converted AC power at the grid-side converter output with the phase angle of the AC voltage generated by the AC power unit that is coupled to the power output of the wind turbine device, the phase controller configured to perform said synchronizing when the wind turbine device is restarted in case of the black-out of the electricity network.

2. The wind turbine device according to claim 1, wherein the AC power unit includes a diesel generator.

3. The wind turbine device according to claim 1, further comprising:
a turbine transformer; and
the coupler being configured for coupling the power unit to the wind turbine side of the turbine transformer.

4. The wind turbine device according to claim 1, wherein the converter device includes a control input for receiving from a wind park controller at least one set point for the converter device, the at least one set point being for an output related variable selected from the group consisting of phase angle, voltage and power.

5. A wind park, comprising:
a wind turbine device according to claim 1;
a further wind turbine device having a power output coupleable to the electricity network; and
a further coupler for coupling the power output of the wind turbine device to the power output of the further wind turbine device to start the further wind turbine device in case of a black-out of the electricity network.

6. The wind turbine device according to claim 5, further comprising:
a wind park control arrangement configured for providing identical set points of an output power related variable to both the wind turbine device and the further wind turbine device wherein the further wind turbine device comprises a control input for receiving from a wind park controller a set point for the converter device.

7. The wind turbine device according to claim 5, further comprising:
a point of common coupling, to which the wind turbine device and the further wind turbine device are coupleable;
a park coupler, the park coupler having a first state in which the point of common coupling is connected to the electricity network, the park coupler having a second state, in which the point of common coupling is disconnected from the electricity network; and
a synchronization unit connectable to the point of common coupling and to the electricity network to determine the frequency of the power provided by the wind turbine device and the frequency of the electricity network and to provide, in response hereto, a synchronization signal to a wind park controller in order to synchronize the frequency of the power provided by the wind turbine to the frequency of the electricity network;
the wind park controller being configured for allowing the park coupler to be set in the first state if the frequency of the power provided by the wind turbine device is synchronized to the frequency of the electricity network.

8. A method of restarting a wind turbine device after a blackout of an electricity network to which the wind turbine device is coupleable, the method comprising:
connecting a switchable coupler between an output of an alternating current (AC) power unit and a line connected to carry power output of the wind turbine device;
generating an alternating current (AC) voltage with the power unit;
coupling the generated voltage to the power output of the wind turbine device via the switchable coupler in case of a black-out of the electricity network whereupon the switchable coupler is operated to connect the power unit to the power output of the wind turbine device;
imitating the electricity network in its running state with the voltage generated by the power unit that is coupled to the power output of the wind turbine device;
converting, by way of a grid-side converter, power generated by a wind turbine generator of the wind turbine device to provide a converted AC power at a grid-side converter output; and
when restarting the wind turbine device in case of the black-out of the electricity network, synchronizing the phase angle of the converted AC power at the grid-side converter output with the phase angle of the AC voltage generated by the AC power unit that is coupled to the power output of the wind turbine device.

9. The method according to claim 8, wherein the AC power unit comprises a diesel generator.

10. The method according to claim 8, further comprising:
setting both, an active power and a reactive power to be generated by the wind turbine device to zero when starting the coupling of the generated voltage to the power output of the wind turbine device.

* * * * *